(12) United States Patent
Bossard

(10) Patent No.: US 10,942,155 B1
(45) Date of Patent: Mar. 9, 2021

(54) SYSTEM AND METHOD FOR ANALYZING GAS THAT USES ENHANCED COLD TRAPS

(71) Applicant: Power & Energy, Inc., Ivyland, PA (US)

(72) Inventor: Peter R. Bossard, Ivyland, PA (US)

(73) Assignee: Power & Energy, Inc., Ivyland, PA (US)

( * ) Notice: Subject to any disclaimer, the term of this patent is extended or adjusted under 35 U.S.C. 154(b) by 0 days.

(21) Appl. No.: 16/659,501

(22) Filed: Oct. 21, 2019

Related U.S. Application Data

(63) Continuation of application No. 15/068,312, filed on Mar. 11, 2016, now abandoned.

(60) Provisional application No. 62/255,520, filed on Nov. 15, 2015.

(51) Int. Cl.
*G01N 30/30* (2006.01)
*G01N 30/66* (2006.01)

(52) U.S. Cl.
CPC .............. *G01N 30/30* (2013.01); *G01N 30/66* (2013.01); *G01N 2030/303* (2013.01); *G01N 2030/3053* (2013.01)

(58) Field of Classification Search
CPC ................... G01N 30/30; G01N 30/66; G01N 2030/3053; G01N 2030/303
See application file for complete search history.

(56) References Cited

U.S. PATENT DOCUMENTS

| 4,325,907 | A | * | 4/1982 | Dembicki, Jr. | ........ | G01N 30/00 |
| | | | | | | 422/54 |
| 5,288,310 | A | * | 2/1994 | Peters | ..................... | G01N 30/12 |
| | | | | | | 96/104 |
| 5,808,178 | A | * | 9/1998 | Rounbehler | ........... | G01N 30/30 |
| | | | | | | 73/23.35 |
| 2008/0148814 | A1 | | 6/2008 | Bostrom et al. | | |
| 2014/0311220 | A1 | * | 10/2014 | Bossard | ................... | G01N 7/10 |
| | | | | | | 73/31.03 |

\* cited by examiner

*Primary Examiner* — Xin Y Zhong
(74) *Attorney, Agent, or Firm* — LaMorte & Associates, P.C.

(57) ABSTRACT

A system and method of determining levels of contaminants in a base gas. A gas chromatography column is used as part of a cold trap. A sample of a base gas is fed through the gas chromatography column. Due to the temperature of the gas chromatography column, some of the contaminants concentrate. A purified carrier gas is directed through the reinforced tube assembly after contaminants have collected. The gas chromatography column is heated to a second temperature that releases at least some of the concentrated contaminants. The contaminants mix with the purified carrier gas to create a contaminated carrier gas. The contaminated carrier gas is directed to one or more testing units that analyze the contaminated carrier gas to quantify the contaminants.

14 Claims, 8 Drawing Sheets

SYSTEM AND METHOD FOR ANALYZING GAS THAT USES ENHANCED COLD TRAPS

RELATED APPLICATIONS

This application claims priority of U.S. Provisional Patent Application No. 62/255,520 filed Nov. 15, 2015.

BACKGROUND OF THE INVENTION

1. Field of the Invention

In general, the present invention relates to systems and methods that are used to detect contamination levels in a purified gas stream. More particularly, the present invention relates to systems and methods that concentrate contaminants in a gas stream using cold traps for the purposes of detecting and/or analyzing the contaminants.

2. Prior Art Description

There are many situations that require the use of an ultra pure gas. For example, ultra pure gases are used in the manufacture of microcircuits. In such use, even the presence of the smallest concentration of contaminants can cause defects in the circuitry being printed. Another example is the use of ultra pure hydrogen when powering a proton exchange membrane (PEM) fuel cell. If the hydrogen gas being used to power the fuel cell contains any significant concentration of contaminants, such as hydrogen sulfide, carbon monoxide or carbon dioxide and other compounds, then the fuel cell will become damaged. If the presence of contaminants persists, then the damage accumulates and the fuel cell will eventually fail. It is for this reason that the hydrogen supplies used to power PEM fuel cells must meet certain purification standards. Such standards vary depending upon the application and type of fuel cell. Purification standards for fuel cell powered automobiles have been set by the Society of Automotive Engineers (SAE). These standards include maximum contamination levels for a variety of contaminants, such as water, oxygen, carbon dioxide, carbon monoxide, sulfur, ammonia, formaldehyde, and formic acid.

Hydrogen gas can be purified when produced. However, the hydrogen gas is held in pressurized containers and piped through various conduits, valves and other plumbing before it is used to refuel an automobile at a filling station. Every surface and environment that comes into contact with the purified hydrogen can add contamination to the hydrogen. As such, it is important that the hydrogen gas at the fill nozzle of a fueling station meet or exceed the purity specifications.

In the past, the only way to test the purity of hydrogen gas at a filling station was to take samples of the hydrogen gas. The collected samples were then sent to remote laboratories for analysis. The analysis could take between several hours to several days to process. This means that a refueling station that produced contaminated hydrogen may do so for many days before the levels of contamination were detected. In the time required for detection, irreversible damage could have been created in the fuel cells of many hydrogen powered vehicles. The liability to the refueling station for providing contaminated fuel is therefore significant.

Once a sample is taken to a laboratory for analysis, the presence of contamination can be readily determined. However, determining what the contamination consists of is far more complex. The nature of the contamination can provide indications as to the source of the contamination in the supply system. Mass Spectrometry Analysis 'MSA' can be performed on the gas samples to identify contaminants. However, the standard MSA does not distinguish molecules of the same molecular weight such as N2 and CO. In this case, $N_2$ is harmless to a PEM fuel cell, while CO at 100 ppb will irreparably damage the fuel cell. Quantifying the amount of both $N_2$ and CO is required because if the concentration of $N_2$ exceeds 100 ppm, the efficiency of the PEM fuel cell is degraded and this reduces the performance of the vehicle, but PEM fuel cell is not permanently damaged. Quantifying these two contaminants allows one to determine if the hydrogen fuel is safe to use. If the $N_2$ and CO are NOT distinguishable, the hydrogen station would have to be shutdown, at significant cost and inconvenience to owners and customers. Some contaminants such as hydrogen sulfide damages the PEM fuel cell at concentrations of 4 ppb and until now required costly equipment that focused on measuring very low levels sulfur. This application presents a significantly enhanced gas chromatography method from less than 1 ppb to more than 1000 across the range of gases that damage fuel cells directly or reduce their efficiency significantly.

A need therefore exists for a system and method of measuring and identifying a wide variety of contaminants in a gas, such as hydrogen, wherein the analysis has a wide dynamic range, is accurate, rapid and can be performed on-site at the dispensing point of the gas. This need is met by the present invention as described and claimed below.

SUMMARY OF THE INVENTION

The present invention is a system and method of determining levels of contaminants in a base gas, such as hydrogen. When using a glass GC column, an assembly is made by passing the glass GC column thru a small diameter stainless steel tube whose ID is slightly larger than the OD of the glass column that is used as the cold trapping medium. The tube-in-tube assembly is part of an enhanced cold trap. Wherein the glass column in metal tube assembly can be set to a wide variety temperatures, rapidly. The trapping assembly can be brought into contact with a low temperature heat sink and rapidly cooled to a first temperature.

A sample volume of a gas under test is fed through the tube assembly or referred to as the "sample loop". Due to the molecular surface coating and the low temperature state of the sample loop, some of the contaminants concentrate in the gas chromatography column of the tube assembly. The volume of the sample loop is typically a fraction of a cubic centimeter. The volume of sample gas used for testing for all contamination is typically less than one standard liter.

An ultrapure hydrogen carrier gas is generated from the sample hydrogen gas stream by using a palladium alloy membrane. The ultrapure hydrogen carrier gas is fed through the sample loop when it is time to eject the sample loop gases into the analytical column that is used to separate the molecular species for identification and quantification in a thermal conductivity detector (TCD).

The tube assembly is moved away from the heat sink and is heated to a second temperature that drives at least some of the concentrated contaminants into the gas phase within the tube assembly. The sample loop is now rotated back into the carrier gas stream. The carrier gas, now carries the impurities from the sample loop thru the analytical column where the contaminations are separated and then go into the thermal conductivity detector. The thermal conductivity detector is held with in a thermal shield at nearly constant temperature, so that the signal to noise ratio is more than $10^6$ and the thermal conductivity detector drift rate is less than 1 uV per second.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention gas contamination detection system can be used to detect small concentrations of contaminants in many purified gases, such as ultra-pure helium, it is especially useful in detecting the level of contaminants in a stream of supposedly ultra-pure hydrogen. Accordingly, the gas contamination detection system is being shown in an exemplary application where it is being used to detect and identify contaminants in a hydrogen gas source. This embodiment is selected in order to set forth one of the best modes contemplated for the invention. The illustrated embodiment, however, is merely exemplary and should not be considered a limitation when interpreting the scope of the appended claims.

Figure 1:
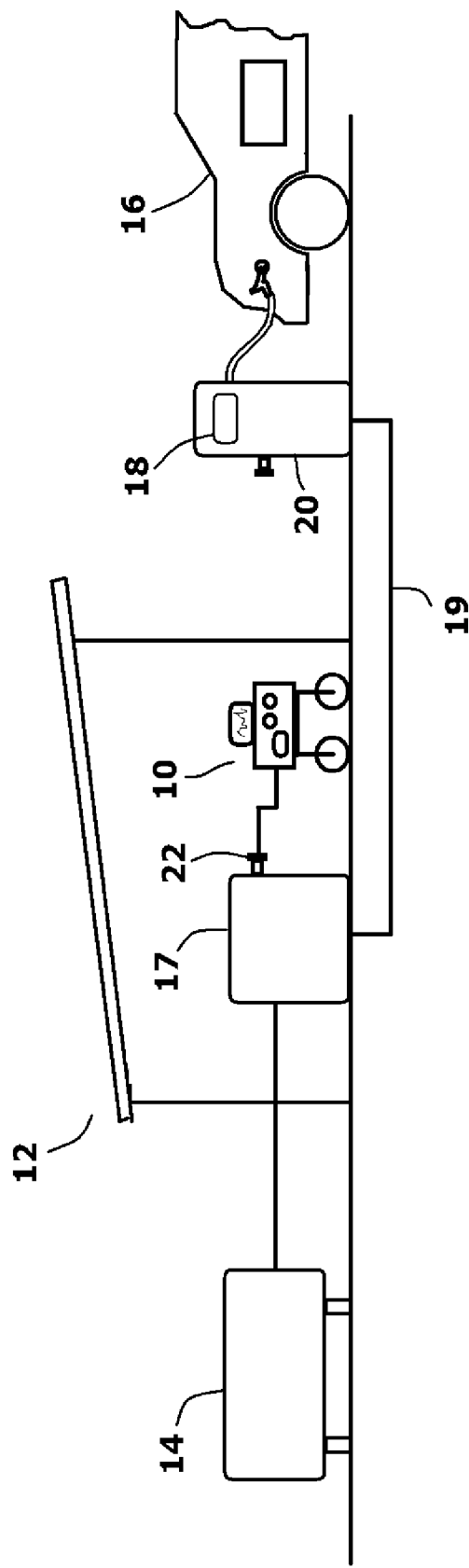
FIG. 1 shows the present invention gas contamination detection system being used to detect contaminants at a refueling station that can provide hydrogen gas to a fuel cell powered vehicle.

Referring to FIG. 1, an exemplary application of the present invention gas contamination detection system 10 is show. Some automobiles run on hydrogen gas using a PEM fuel cell. These automobiles fill up at specialized fueling stations that either store or generate hydrogen gas. The hydrogen gas is supposed to be pure and free of any level of contaminants that can harm the PEM fuel cell within the automobile.

In FIG. 1, a fueling station 12 is shown. The refueling station 12 has a hydrogen gas source 14, which are typically tanks of supposedly purified hydrogen. A hydrogen generator may also be used. The hydrogen gas is used to refuel hydrogen powered automobiles 16. Between the hydrogen gas source 14 and the automobiles 16 are the primary gas flow controls 17 in the refueling station 12, the secondary gas flow controls 18 at the fuel pump 20 and a myriad of conduits 19 that interconnect these components. All of these components are capable of introducing contaminants into hydrogen gas as the hydrogen gas flows through these components.

The refueling station 12 has sampling ports 22 at the primary gas flow controls 17 and/or at the fuel pump 20. The sampling ports 22 are used to collect samples of the hydrogen gas for quality testing.

The gas contamination detection system 10 is configured as a portable machine that can be attached to any sampling port 22. The gas contamination detection system 10 may reside at the refueling station 12 or can be transported from station to station by a municipal inspection officer. The gas contamination detection system 10 provides empirical data concerning the level of contamination in the hydrogen gas at that refueling station 12. Furthermore, the contaminants present can be chemically identified. The analysis is completed by operating the gas contamination detection system 10 for only a few minutes.

Figure 2:
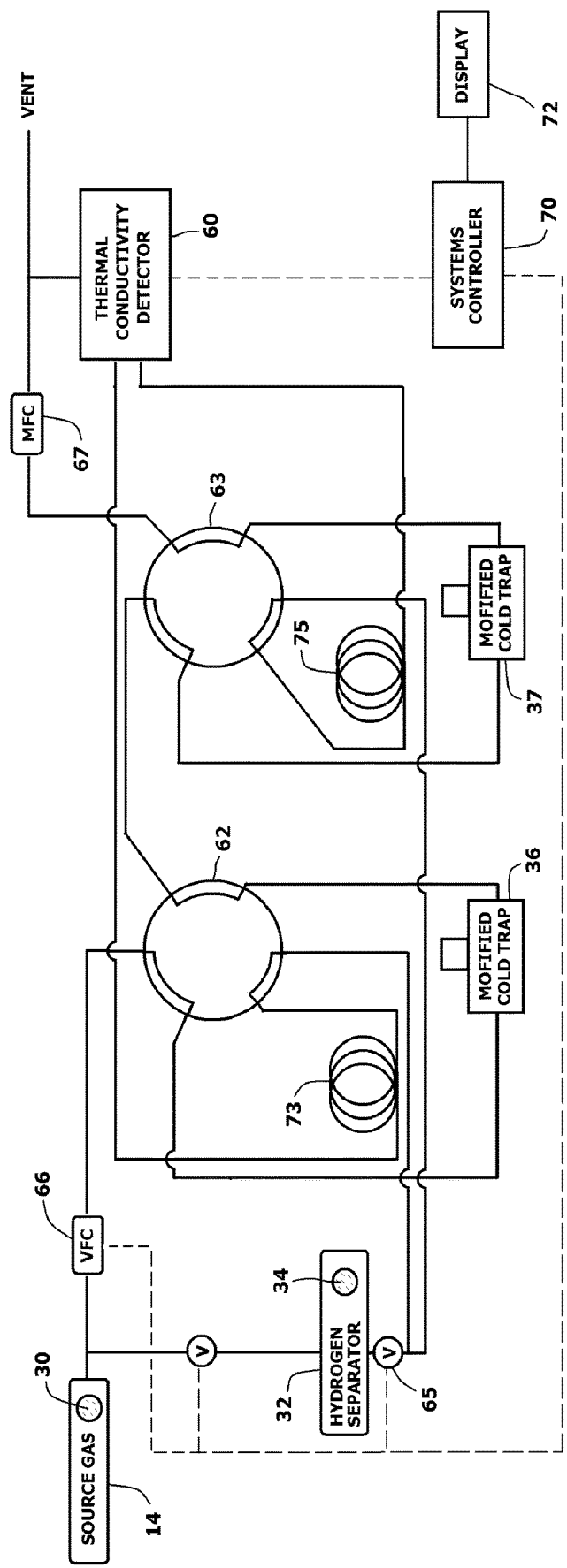
FIG. 2 is a schematic of the gas contamination detection system.

Referring to FIG. 2, an overview of the gas contamination detection system 10 is shown. As can be seen, the gas contamination detection system 10 is attached to the hydrogen gas source 14 that supplies the hydrogen gas to be tested. This hydrogen gas is herein referred to as the test hydrogen gas 30, wherein the test hydrogen gas 30 contains hydrogen gas and some concentrations of various unidentified contaminants.

A hydrogen separator 32 is provided. Some of the test hydrogen gas 30 is diverted into the hydrogen separator 32. The hydrogen separator 32 contains a palladium alloy membrane that is hydrogen permeable. As such, only ultra pure hydrogen passes through the hydrogen separator 32. This produces a stream of ultra pure hydrogen 34. Hydrogen separators of this type are commercially available.

The hydrogen gas contamination detection system 10 utilizes at least one enhanced cold trap and preferably a plurality of enhanced cold traps. In the exemplary embodiment, two enhanced cold traps 36, 37 are provided. However, it should be understood that the present invention can be practiced in a system with one enhanced cold trap or more than two enhanced cold traps. Two enhanced cold traps are shown as part of a preferred exemplary system.

The enhanced cold traps 36, 37 include a first enhanced cold trap 36 and a second enhanced cold trap 37. As will be later explained, each of the enhanced cold traps 36, 37 is novel and is capable of becoming either hot or cold in an extremely rapid and energy efficient manner. The enhanced cold traps 36, 37 operate in both a cold mode and a hot mode. When in a cold mode, each of the enhanced cold traps 36, 37 is capable of cooling any passing test hydrogen gas 30 to a low temperature of between −40 Celsius and −70 Celsius. When in a hot mode, each of the enhanced cold trap 36, 37 is capable of heating the test hydrogen gas 30 to a high temperature of between 130 Celsius and 180 Celsius. The transition between the cold mode and hot mode and vice verse is preferably achieved in one minute or less.

Figure 3:
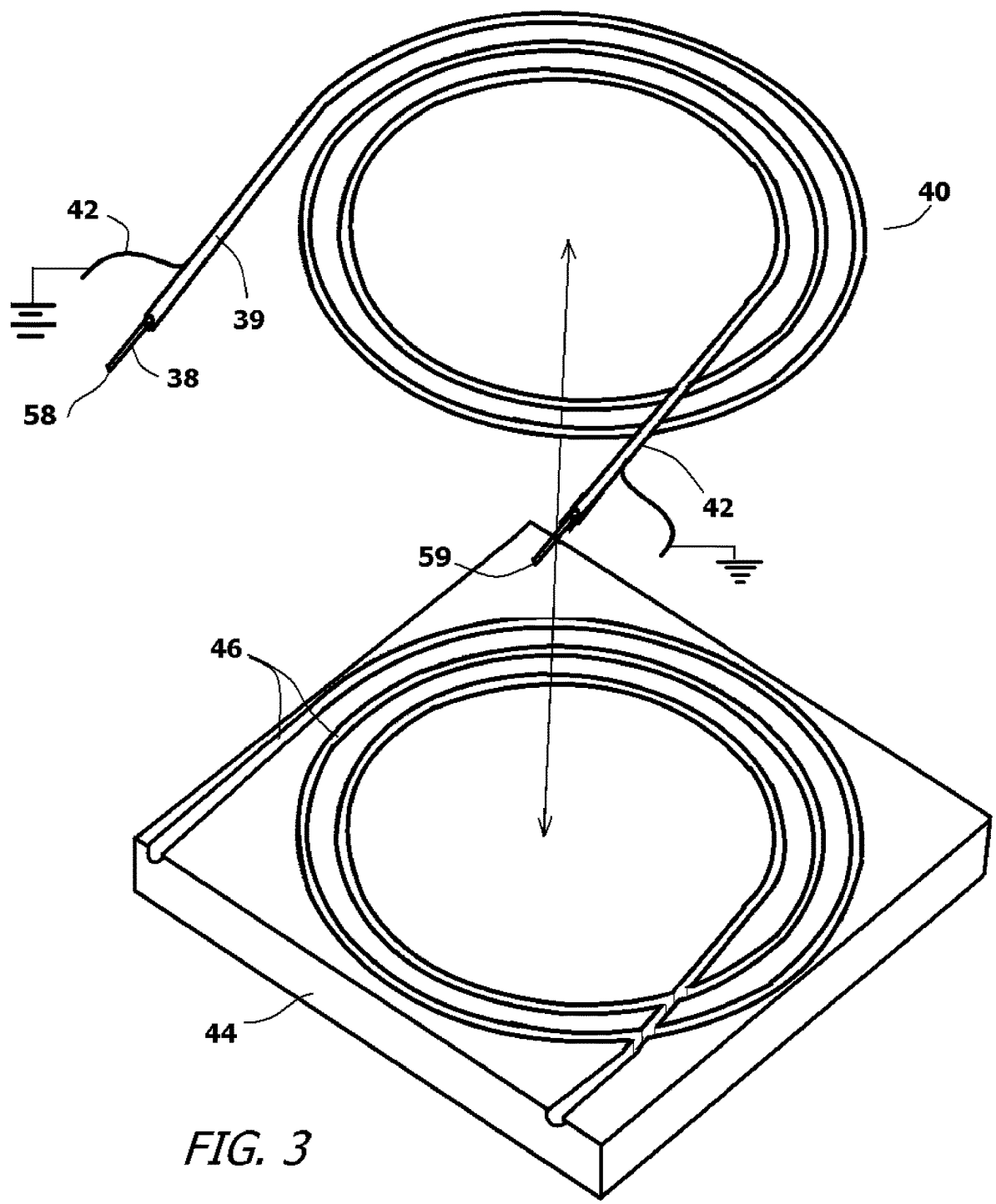
FIG. 3 is an isolated perspective view of the tube assembly used within the cold trap of the gas contamination detection system.

Referring to FIG. 3 in conjunction with FIG. 2, it can be seen that each of the enhanced cold traps 36, 37 contains a winding of a gas chromatography column 38. The gas chromatography column 38 is sleeved within a resistive reinforcement tube 39. The resistive reinforcement tube 30 can be a tube that is separate from the gas chromatography column 38 or it can be a coating applied to the exterior of the gas chromatography column 38. The resistive reinforcement tube 39 is preferably stainless steel or a resistive ceramic. However, other non-reactive materials can be used that efficiently generate heat when subjected to a passing electrical current. The gas chromatography column 38 sleeved within a resistive reinforcement tube 39 creates a reinforced tube assembly 40. If the resistive reinforcement tube 39 is a separate tube, it is desired to have the correct tolerances possible between the interior of the reinforcement tube 39 and the exterior of the gas chromatography column 38. In this manner, the ideal gap spaces exist and there is good thermal conductivity between the resistive reinforcement tube 39 and the gas chromatography column 38. Furthermore, the resistive Sample Loop 39 provides support and strength to the gas chromatography column 38, therein making the reinforced tube assembly 40 more resilient and resistant to thermal stresses.

Electric leads 42 attach to the sample loop that is embodied in the illustration as the resistive reinforcement tube 39. When either of the enhanced cold traps 36, 37 are operating in their hot modes, electricity is applied to the electric leads 42. This causes current to run through the material of the resistive reinforcement tube 39. This rapidly heats the resistive reinforcement tube 39 and the gas chromatography column 38 within the resistive reinforcement tube 39. The electrical current is regulated to achieve the desired temperature within the gas chromatography column 38 during hot mode operations.

Figure 4:
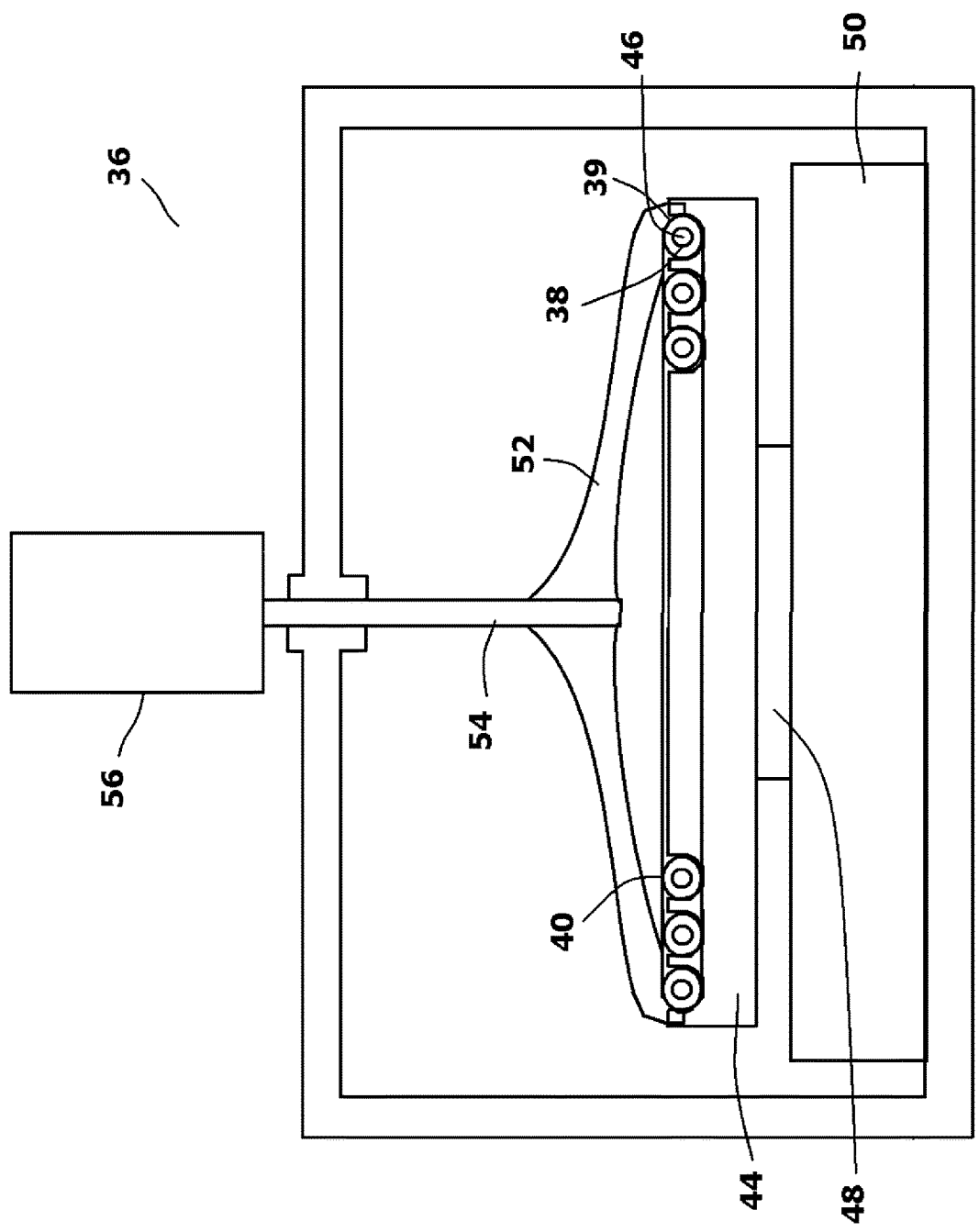
FIG. 4 is a cross sectional view of the cold trap with the reinforced tube assembly in a cold operating mode.
Figure 5:
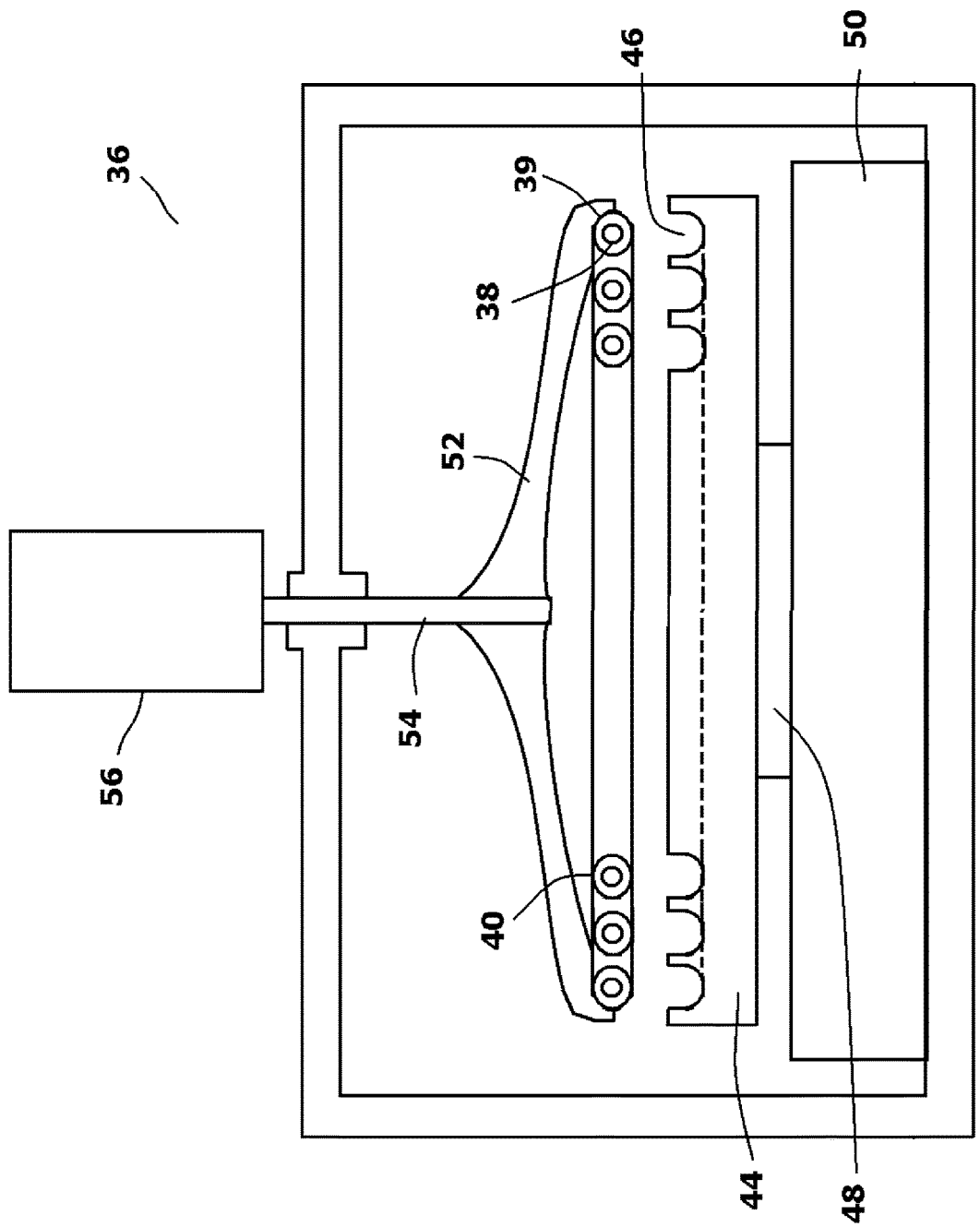
FIG. 5 is a cross-sectional view of the cold trap with the reinforced tube assembly in a hot operating mode.

Referring to FIG. 4 and FIG. 5 in conjunction with FIG. 2 and FIG. 3, it will be understood that each of the enhanced cold traps 36, 37 has a heat sink plate 44. The heat sink plate 44 contains multiple inset relief grooves 46 that are sized and positioned to receive the reinforced tube assembly 40. When the reinforced tube assembly 40 sits within the relief grooves 46, good thermal conductivity exists between the heat sink plate 44 and the material of the reinforcement tube 39, wherein heat can be directed conducted through the touching elements.

The heat sink plate 44 is actively cooled. A primary Peltier cooling module 48 is coupled to the heat sink plate 44 that cools the heat sink plate 44 using the thermoelectric effect. The primary Peltier cooling module 48 is itself cooled by a cooling plate 50. The cooling plate 50 is a commercial product that contains one or more internal Peltier cooling modules. Using the primary Peltier cooling module 48 and the cooling plate 50, the heat sink plate 44 is maintained at a temperature of between −40 Celsius and −70 Celsius.

The heat sink plate 44 and the reinforcement tube assembly 40 are capable of moving relative to each other. In the shown embodiment, the heat sink plate 44 is stationary. The reinforced tube assembly 40 moves between two positions relative the heat sink plate 44. However, it should be understood that this moving dynamic can be reversed.

Assuming the reinforced tube assembly 40 moves, its first position is used during the cold mode operations. In the first position, the reinforced tube assembly 40 contacts the heat sink plate 44 within the relief grooves 46, wherein the heat sink plate 44 absorbs heat from the reinforced tube assembly 40 through direct thermal conduction. This first position is shown in FIG. 4.

In the second position, the reinforced tube assembly 40 is lifted away from the heat sink plate 44 and no thermal conduction occurs between the reinforced tube assembly 40 and the heat sink plate 44. The second position is used during the hot mode operations. This second position is shown in FIG. 5.

The reinforced tube assembly 40 is attached to a support 52. The support 52 is attached to a piston rod 54. The piston rod 54 is reciprocally moved up and down by an activator 56. The activator 56 can be a motor, solenoid or piston. As the piston rod 54 is pulled up, the reinforced tube assembly 40 is lifted to the second position. In the second position, the reinforced tube assembly 40 is separated from the heat sink plate 44, as is shown in FIG. 5. Conversely, when the piston rod 54 is down, the reinforced tube assembly 40 is dropped to its first position. In the first position, the reinforced tube assembly 40 contacts the heat sink plate 44, as is shown in FIG. 4.

The reinforced tube assembly 40 has a first gas port 58 and a second gas port 59 at its opposite ends. Referring back to FIG. 2, it can be seen that the gas output port 59 is coupled to at least one thermal conductivity detector 60 via a set of rotary valves 62, 63. Each of the rotary valves 62, 63 has multiple ports. Different pairings of the ports can be interconnected by altering the rotational settings of the rotary valves 62, 63. The setting of the rotary valves 62, 63 are determined by a systems controller 70. Other systems valves, such as an output valve 65 of the hydrogen separator 32 and the volume flow control valve 66 are also controlled by the systems controller 70. The systems controller 70 also controls the operation of the two enhanced cold traps 36, 37. Lastly, the systems controller 70 receives the data output from the thermal conductivity detector 60 and formulates that data into a readable output display 72.

Figure 6:
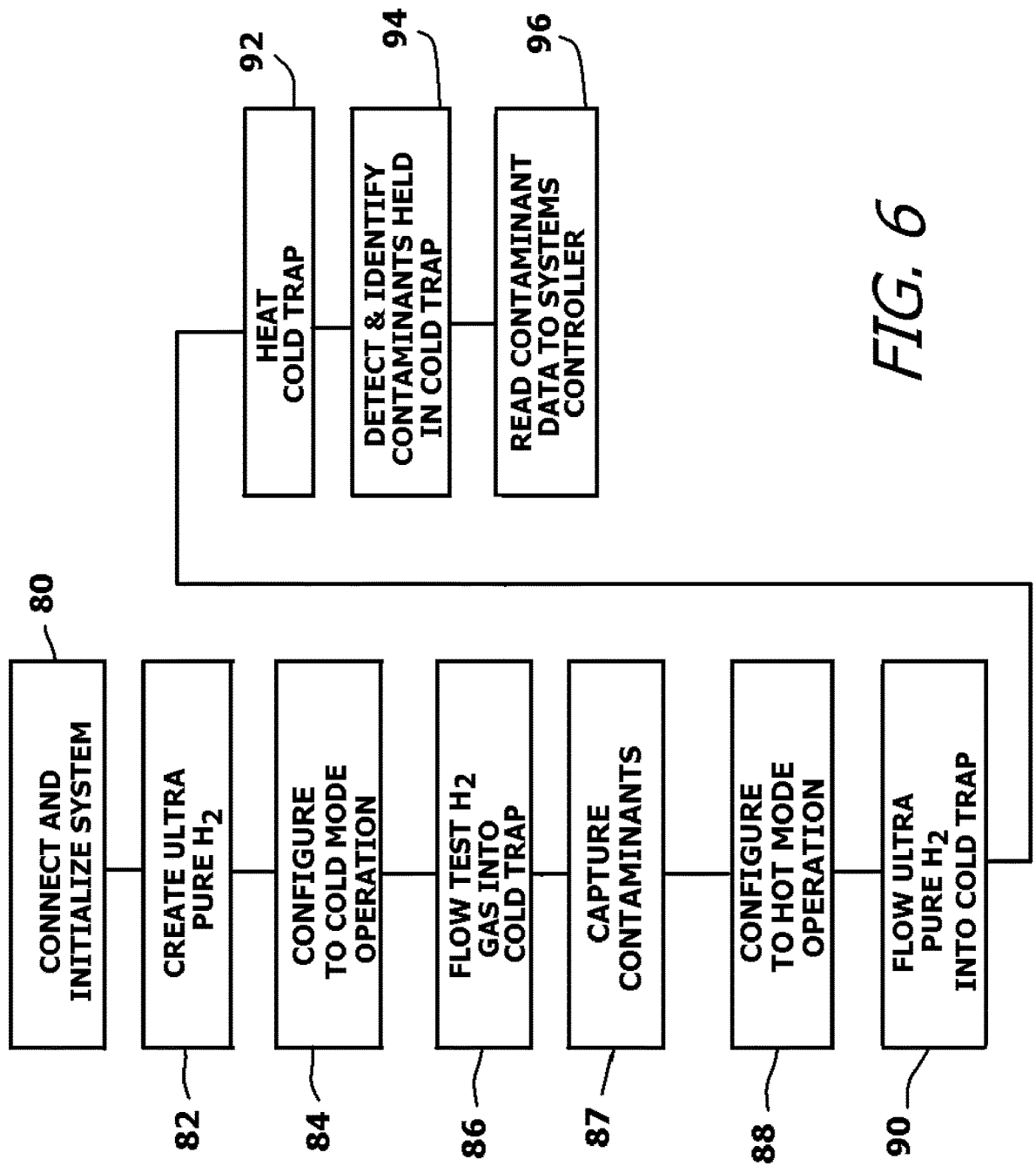
FIG. 6 is a logic flow schematic showing the methodology of operations.
Figure 7:
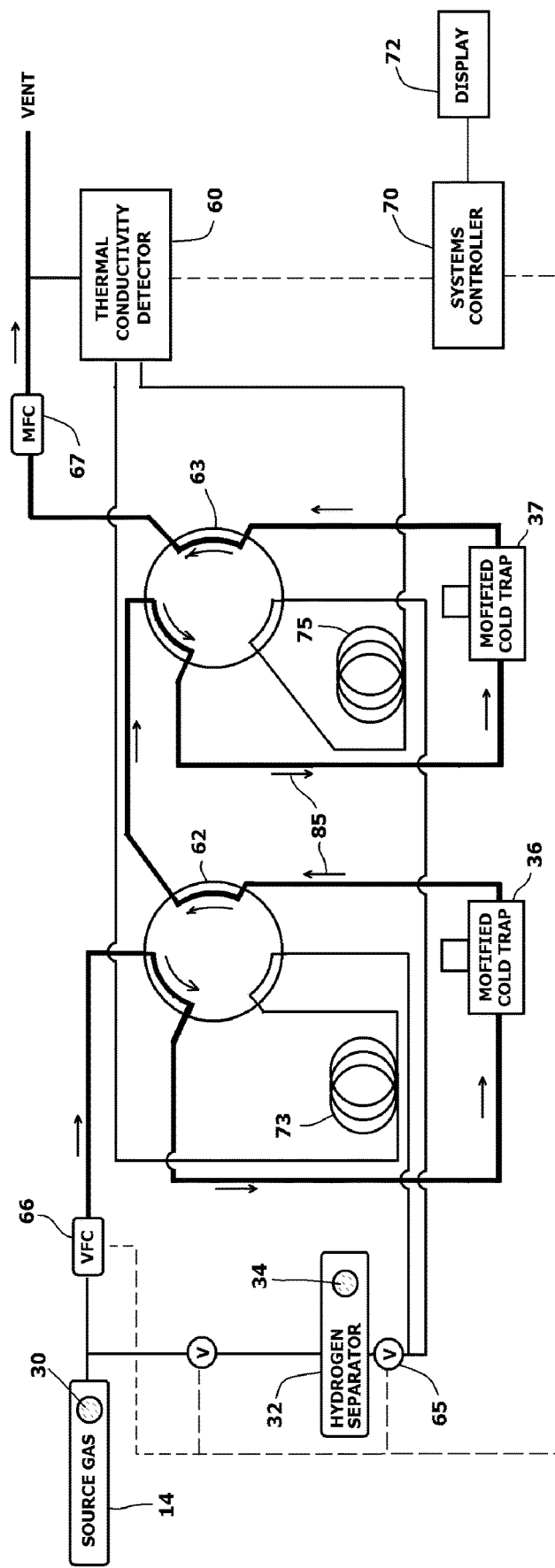
FIG. 7 is a schematic of the gas contamination detection system showing gas flow in its cold operating mode.

Referring to FIG. 6 in conjunction with FIG. 7, the initial method of operation for the gas contamination detection system 10 can be explained. As is indicated by Block 80, the gas contamination detection system 10 is connected to the hydrogen gas source 14 and the system 10 is initialized. During initialization, some of the test hydrogen gas 30 is diverted through the hydrogen separator 32 to create the stream of ultra-pure hydrogen 34. See Block 82.

The enhanced cold traps 36, 37 are set into their cold modes of operation, wherein each reinforced tube assembly 40 is cooled by being pressed into contact with the heat sink plate 44. See Block 84. Gas flow in the cold mode configuration is shown by the illustrated flow direction arrows 85. In the cold mode of operation, the reinforced tube assembly 40 rapidly cools to the operating temperature of the heat sink plate 44.

The systems controller 70 configures the rotary valves 62, 63 so that the test hydrogen gas 30 flows into the first enhanced cold trap 36 and then the second enhanced cold trap 37. See Block 86. The first enhanced cold trap 36 preferably captures the contaminating molecules that have dipole moments, such as water, carbon dioxide, sulfur compounds, and hydrocarbons. The rotary valves 62, 63 then directs the output of the first enhanced cold trap 36 into the second enhanced cold trap 37. The second enhanced cold trap 37 preferably mole sieve column that captures molecules based on their size and shape of gas molecules. The second enhanced cold trap is designed to capture contaminants that are not trapped using a dipole column as the enhanced cold trap.

The second enhanced cold trap 37 concentrates the remaining contaminates that passed through the first enhanced cold trap 36. See Block 87. The remaining hydrogen gas flows from the second enhanced cold trap 37 to a vent after first being measured by a mass flow meter 67.

The mass flow meter 67 determines when an appropriate hydrogen sample size has passed through the enhanced cold trap concentrators so that it can be quantified. Once an appropriate sample size has passed through the enhanced cold traps, the system is configured for its hot mode operation. See Block 88.

Figure 8:
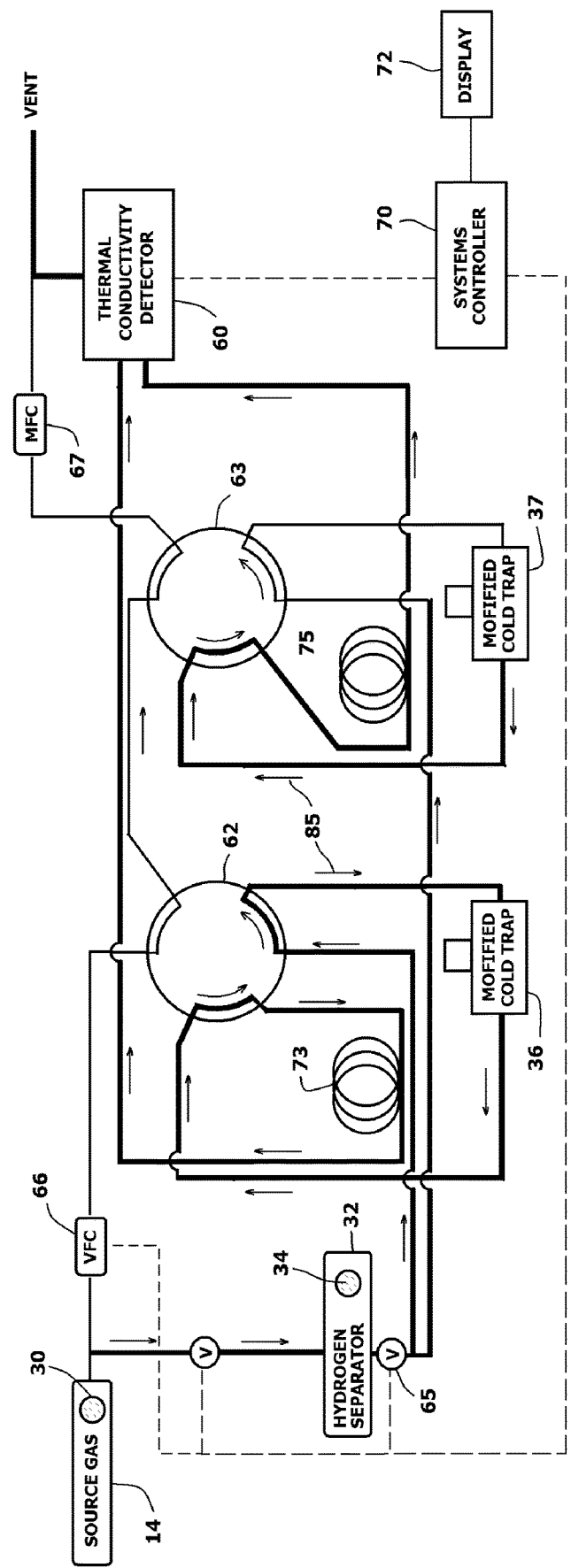
FIG. 8 is a schematic of the gas contamination detection system showing gas flow in its hot operating mode.

Referring to FIG. 8 in conjunction with FIG. 6 and FIG. 3, it can be seen that the rotary valves 62, 63 are reconfigured to direct ultra pure hydrogen into the enhanced cold traps 36, 37. See Block 90. This reconfiguration also connects the enhanced heat traps 36, 37 to the thermal conductivity detector 60. The thermal conductivity detector 60 is calibrated to detect secondary contaminants.

The enhanced cold traps 36, 37 are rapidly converted into their hot modes. See Block 92. This is done by passing current through the resistive reinforcement tube 39 surrounding the gas chromatography column 38. Simultaneously, the reinforced tube assembly 40 is lifted out of contact with the heat sink plate 44. In these conditions, the reinforced tube assembly 40 and the contaminants it holds change temperature from about −70 Celsius to about +180 Celsius in preferably less than one minute.

As the enhanced cold traps 36, 37 heat, the captured contaminants rapidly vaporize and pass into the ultra pure hydrogen gas 34 flowing through the reinforced tube assembly 40. All of the contaminants are released in a wave. This wave of contaminants is directed to the thermal conductivity connector 60. The thermal conductivity connector 60 can then detect and identify the contaminants. See Block 94.

Secondary gas chromatography columns 73, 75 can be used in the pathways to the thermal conductivity connector 60 to slow the flow of different contaminates to different rates. In this manner, they can be better identified by the time needed for the contaminants to reach the thermal conductivity connector 60.

The data concerning the concentration and identification of the contaminants is read by the systems controller 70. See Block 96. The systems controller 70 utilizes the data to create the output display 72. See Block 98.

After a test cycle, all pathways that were exposed to contaminants are purged using the stream of ultra pure hydrogen gas 34. The process can then be repeated as needed.

It will be understood that the embodiment of the present invention system that is illustrated and described is merely exemplary and that a person skilled in the art can make many variations to that embodiment. All such embodiments are intended to be included within the scope of the present invention as defined by the claims.

What is claimed is:

1. A method of determining contamination levels within a source of hydrogen gas that contains contaminants, said method comprising the steps of:
    providing a first cold trap that contains a gas chromatography column configured into a first winding, wherein said first cold trap is capable of capturing some of said contaminates that have dipole moments;
    providing a first heat sink plate that contains a first set of inset relief grooves that are sized and positioned to receive said first winding therein;
    providing a first activator for relatively moving said first winding and said first heat sink plate between a first configuration, where said first winding is separated from said first heat sink plate, and a second configuration, where first winding is received within said first set of inset grooves, therein creating direct contact between said first winding and said first heat sink plate;
    providing a second cold trap that contains a molecular sieve column configured into a second winding, wherein said second cold trap is capable of capturing some of said contaminants based upon contaminant size;
    providing a second heat sink plate that contains a second set of inset relief grooves that are sized and positioned to receive said second winding therein;
    providing a second activator for relatively moving said second winding and said second heat sink plate between a first orientation, where said first winding is separated from said second heat sink plate and a second orientation, where second winding is received within said second set of inset grooves, therein creating direct contact between said second winding and said second heat sink plate;
    providing a hydrogen separator;
    creating a purified carrier gas by passing some of said hydrogen gas through said hydrogen separator;
    having said first activator move said first winding and said first heat sink plate into said first configuration, and having said second activator move said second winding and said second heat sink plate into said first orientation;
    cooling said first heat sink plate and said second heat sink plate, therein cooling said first winding and said second winding to a first temperature;
    passing a sample volume of said hydrogen gas through said first winding and said second winding, wherein some of said contaminants concentrate in said first winding and said second winding;
    having said first activator move said first winding and said first heat sink plate into said second configuration, and having said second activator move said second winding and said second heat sink plate into said second orientation;
    heating said first winding and said second winding to a second temperature that vaporizes said contaminants within said first winding and said second winding;
    flushing said contaminates from said first cold trap and said second cold trap with said purified carrier gas, therein forming a contaminated carrier gas; and
    analyzing said contaminated carrier gas to quantify said contaminants.

2. The method according to claim 1, wherein said first temperature is between −40 Celsius and −70 Celsius.

3. The method according to claim 1, wherein said second temperature is between 140 Celsius and 180 Celsius.

4. The method according to claim 1, wherein the step of analyzing said contaminated carrier gas to quantify said contaminants includes sampling at least part of said contaminated carrier gas with at least one thermal conductivity detector.

5. The method according to claim 4, further including providing secondary gas chromatography columns, wherein said contaminates flushed from said first cold trap and said second cold trap are delayed by said secondary gas chromatography columns prior to reaching said at least one thermal conductivity detector.

6. A method of determining contamination levels within a source of hydrogen gas that contains contaminants, said method comprising the steps of:
    providing a testing machine that contains a hydrogen separator, a heat sink plate, an actuator and a cold trap, wherein said cold trap that has a gas chromatography column configured into a first winding, said heat sink contains inset grooves that can receive said first winding, and said actuator selective moves said first winding into and out of contact with said inset grooves on said heat sink plate;
    creating a purified carrier gas by passing some of said hydrogen gas through said hydrogen separator;
    utilizing said actuator to move said first winding into contact with said inset grooves on said heat sink plate;
    cooling said first winding to a first temperature;
    passing a sample volume of said hydrogen gas through said cold trap, wherein some of said contaminants concentrate in said cold trap;
    utilizing said actuator to move said first winding out of contact with said inset grooves on said heat sink plate;

heating said first winding to a second temperature that vaporizes said contaminants within said first winding;

flushing said contaminates from said first cold trap with said purified carrier gas, therein forming a contaminated carrier gas; and analyzing said contaminated carrier gas to quantify said contaminants.

7. The method according to claim 6, wherein said testing machine further includes a second cold trap.

8. The method according to claim 7, further including the step of passing a sample volume of said hydrogen gas through said second cold trap after passing through said first cold trap.

9. The method according to claim 8, further including the step of heating said second cold trap to said second temperature.

10. The method according to claim 9, further including the step of flushing second cold trap with said purified carrier gas, therein forming said contaminated carrier gas.

11. The method according to claim 6, wherein said first temperature is between −40 Celsius and −70 Celsius.

12. The method according to claim 6, wherein said second temperature is between 140 Celsius and 180 Celsius.

13. The method according to claim 6, wherein the step of analyzing said contaminated carrier gas to quantify said contaminants includes sampling at least part of said contaminated carrier gas with at least one thermal conductivity detector.

14. The method according to claim 13, further including providing a secondary gas chromatography column, wherein said contaminates flushed from said first cold trap are delayed by type by said gas chromatography column prior to reaching said at least one thermal conductivity detector.

* * * * *